Sept. 28, 1937.　　　　G. L. MOSES　　　　2,094,370
CONTROL SYSTEM
Filed June 26, 1936　　　　2 Sheets-Sheet 1

WITNESSES:
Michael Stark

INVENTOR
Graham L. Moses.
BY
Crawford
ATTORNEY

Sept. 28, 1937.                G. L. MOSES'                    2,094,370
                                CONTROL SYSTEM
                              Filed June 26, 1936            2 Sheets-Sheet 2
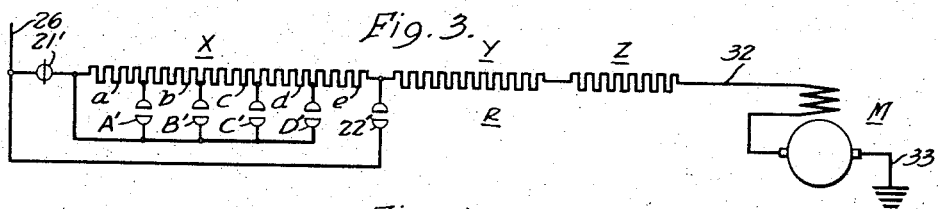
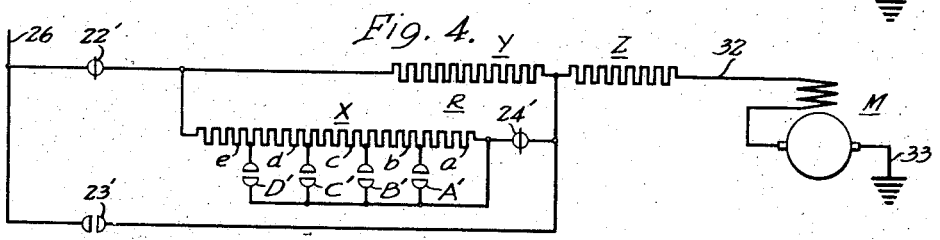
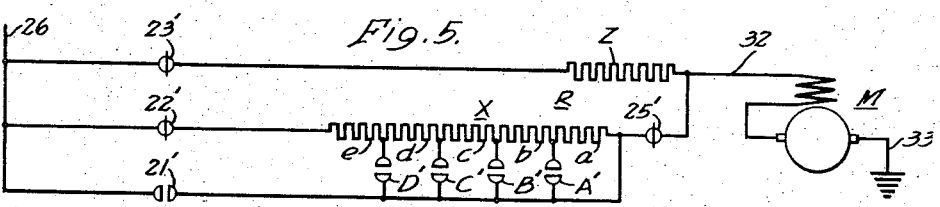
Fig. 6.
|    | Switches |   |   |   |   |    |    |    |    |
|----|----|---|---|---|---|----|----|----|----|
|    | 21 | A | B | C | D | 22 | 24 | 23 | 25 |
| 1  | O  |   |   |   |   |    |    |    |    |
| 2  | O  | O |   |   |   |    |    |    |    |
| 3  | O  | O | O |   |   |    |    |    |    |
| 4  | O  |   | O | O |   |    |    |    |    |
| 5  | O  |   |   | O | O |    |    |    |    |
| 6  |    |   |   |   |   | O  |    |    |    |
| 7  |    |   |   |   |   | O  | O  |    |    |
| 8  |    | O |   |   |   | O  | O  |    |    |
| 9  |    | O | O |   |   | O  | O  |    |    |
| 10 |    |   | O | O |   | O  | O  |    |    |
| 11 |    |   | O | O | O | O  | O  |    |    |
| 12 |    |   |   |   |   | O  |    | O  |    |
| 13 |    |   |   |   |   | O  |    | O  | O  |
| 14 |    | O |   |   |   | O  |    | O  | O  |
| 15 |    | O | O |   |   | O  |    | O  | O  |
| 16 |    |   | O | O |   | O  |    | O  | O  |
| 17 |    |   |   | O | O | O  |    | O  | O  |
| 18 | O  |   |   |   |   | O  |    | O  | O  |
WITNESSES:                                              INVENTOR
Michael Stark                                        Graham L. Moses.
                                                     BY
                                                          Crawford
                                                          ATTORNEY Patented Sept. 28, 1937

2,094,370

UNITED STATES PATENT OFFICE 2,094,370

CONTROL SYSTEM

Graham L. Moses, Pittsburgh, Pa., assignor to Westinghouse Electric & Manufacturing Company, East Pittsburgh, Pa., a corporation of Pennsylvania Application June 26, 1936, Serial No. 87,366

9 Claims. (Cl. 172—179)

My invention relates, generally, to control systems and more particularly to systems for controlling the acceleration and speed of electric motors.

An object of my invention, generally stated, is to provide a control system for electric motors which shall be simple and efficient in operation and which may be readily and economically manufactured.

A more specific object of my invention is to provide a relatively large number of notches or accelerating steps for an electric motor with a minimum amount of apparatus.

Another object of my invention is to provide an accelerating control system which may be utilized for controlling the operation of an electric railway motor.

Still another object of my invention is to provide for so accelerating an electric railway vehicle that the increments in tractive effort are imperceptible to the passengers, even when relatively high accelerating rates are maintained.

Other objects of my invention will be explained fully hereinafter or will be apparent to those skilled in the art.

According to one embodiment of my invention, the resistor utilized for controlling the motor current during acceleration is divided into two or more sections. Only one of these sections, called the vernier section, is sub-divided into steps and its resistance is varied by means of a drum controller or power-operated contactors. The other section or sections have a fixed resistance which is not changed by manipulating the control. However, the effective resistance of the whole resistor is varied by connecting the variable, or vernier, section in various combinations with the other section or sections. The resistance of the different sections and the steps of the variable vernier section are so proportioned that the desired acceleration of the motor is produced by the notching operations.

For a fuller understanding of the nature and objects of my invention, reference may be had to the following detailed description, taken in conjunction with the accompanying drawings, in which:

Figs. 3, 4 and 5 are diagrammatic views showing various steps in the progression of the control system, and Fig. 6 is a chart showing the sequence of operation of the switching devices utilized in the control system.

Figure 1:
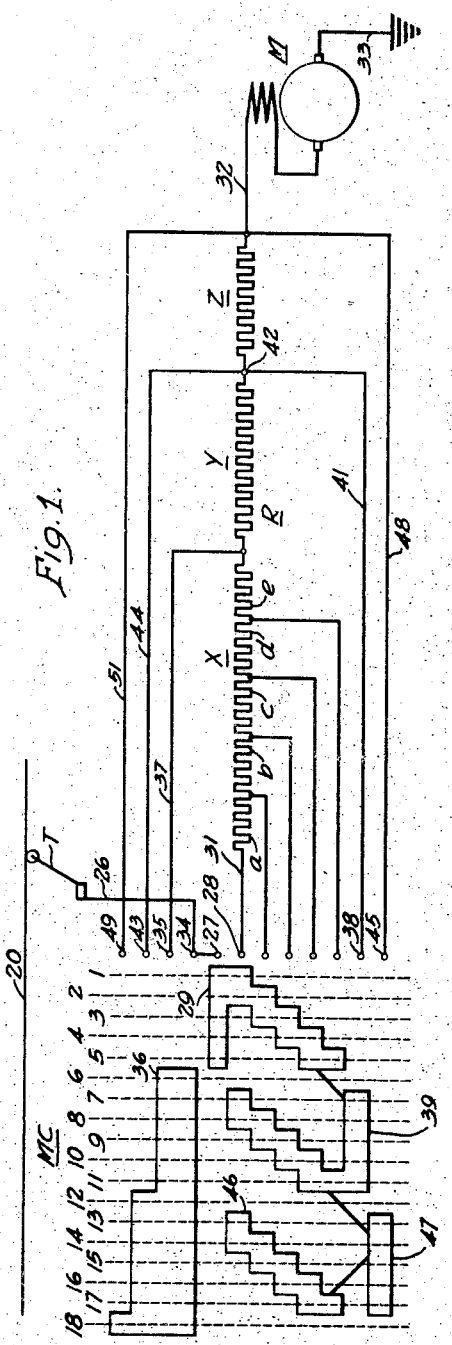
Figure 1 is a diagrammatic view of a control system embodying the invention.

Referring to the drawings, and particularly to Fig. 1, the system shown comprises a motor M, an accelerating resistor R and a master controller MC. Power for operating the motor M is supplied through a trolley T which engages a conductor 20 that may be energized from any suitable source, such as a power generating station (not shown).

In order to provide smooth acceleration of the motor, it is necessary to increase the voltage applied to the motor by relatively small increments and in the past this has usually been accomplished with direct current motors by sub-dividing the accelerating resistor into a large number of steps which are successively shunted from the motor circuit by the control apparatus. Prior systems having a sufficient number of notches, or steps, to insure the desired smoothness of operation of the vehicle propelled by the motor have required either a large number of power-operated contactors for shunting the accelerating resistor or large and complicated controllers, or equivalent structure, having a multiplicity of contact fingers.

In the system herein described the resistor R is divided into three sections, X, Y and Z and only the section X, called the vernier section, is made variable in resistance by means of fingers and drum contacts or power-operated contactors. The other two sections or portions, Y and Z, each have a fixed resistance which is not changed by manipulating the control. However, the effective resistance of the whole resistor is varied by connecting the vernier section X in various combinations with the other two sections and shunting the vernier section in successive steps by means of relatively simple control apparatus. Thus, by way of example, the section X may be sub-divided into five steps, $a$, $b$, $c$, $d$, and $e$, which, when combined with the sections Y and Z in the manner herein described, provides an accelerating system having 18 notches or steps, thereby affording relatively smooth acceleration of the motor. It will be understood that the number of notches may be increased if desired either by increasing the number of sub-divisions in the variable portion of the resistor or by increasing the number of fixed portions, or both.

In order that the functioning of the apparatus may be better understood, the operation of the system will now be described. The sections X, Y and Z of the resistor R may be connected in series with the motor M by actuating the controller MC to position 1, thereby connecting the motor to the power conductor 20. The motor circuit extends through the trolley T, conductor 26, contact fingers 27 and 28, which are bridged by a contact segment 29, conductor 31, the resistor sections X, Y and Z, conductor 32 and the motor M to the grounded conductor 33.

The sub-divisions a, b, c, d and e of the resistor section X are then successively shunted from the motor circuit by actuating the controller MC through positions 2 to 6, inclusive, thereby causing the resistor X to be shunted step-by-step by means of the controller MC in a manner well known in the art, to decrease the resistance in the motor circuit and accelerate the motor.

When the controller MC is actuated to position 7, the resistor portions X and Y are connected in parallel circuit relation in the motor circuit and in series with the section Z. The motor circuit may now be traced from the conductor 26 through contact fingers 34 and 35 bridged by a segment 36, conductor 37, the resistor section X, conductor 31, contact fingers 28 and 38 which engage the contact segment 39, conductor 41 to the junction point 42 between the resistor sections Y and Z and thence through the section Z, conductor 32 and motor M to the grounded conductor 33. The parallel circuit through the section Y extends from conductor 37, through the resistor Y to the junction point 42, and thence through the resistor Z and the motor M to the grounded conductor 33.

The effective resistance in the motor circuit is again reduced by operating the controller MC through positions 8 to 12, inclusive, to repeat the shunting of the resistor section X in successive steps, as hereinbefore explained.

When the controller MC is actuated to position 13, the resistance in the motor circuit is reduced by connecting the resistor sections X and Z in parallel circuit relation. The motor circuit now extends from the conductor 26 through contact fingers 34 and 43 which engage the segment 36 and conductor 44 to the junction point 42, thence through the resistor Z, conductor 32 and the motor M to the grounded conductor 33. The parallel circuit through the resistor X may be traced from the conductor 26 through contact fingers 34 and 35 bridged by the segment 36, conductor 37, the resistor X, conductor 31, contact fingers 28 and 45 which engage the segments 46 and 47, respectively, conductors 48 and 32 and the motor M to the grounded conductor 33.

The effective resistance in the motor circuit may be reduced step-by-step by actuating the controller MC through positions 14 to 18, inclusive, thereby repeating the shunting of the sub-divisions a to e of the resistor X from the motor circuit. When the controller is on position 18 the motor M is connected directly to the power source through a circuit which extends from the conductor 26, through contact fingers 34 and 49 which are bridged by the segment 36, conductors 51 and 32, and the motor M to the grounded conductor 33.

In this manner, the effective resistance in the motor circuit is varied by first connecting all three sections of the resistor R in series circuit relation and shunting the vernier section X from the motor circuit in successive steps, then reconnecting the resistor sections X and Y in parallel circuit relation and in series with the resistor Z in the motor circuit and again shunting the vernier section X from the motor circuit, then finally connecting the vernier section X and the fixed section Z in parallel circuit relation in the motor circuit and repeating the shunting of the vernier section X in successive steps. Thus it will be seen that a comparatively large number of accelerating steps or notches are obtained by providing a relatively small number of contact fingers on the controller MC, thereby permitting smooth acceleration of the motor to be obtained without utilizing a controller drum of an excessive length or exceedingly complicated in design.

It will be understood that the relative values of resistance in the different sections of the resistor R will depend upon the operating characteristics of the motor M. As a specific example, satisfactory notching for a motor of a particular type may be obtained by providing approximately 65% of the total resistance in the motor circuit in the section X, 20% in the section Y and 15% in the section Z. The sub-divisions a, b, c, d and e of the vernier section X contain approximately 35, 15, 7, 5 and 3 per cent, respectively, of the total resistance of the resistor R, in the specific example herein illustrated.

The system herein described utilizes the fact that during the first part of the accelerating operation the notches require relatively large steps of resistance from notch to notch and that these steps rapidly decrease in size for satisfactory and smooth acceleration. As the effective resistance is reduced and the motor current builds up to a value producing the maximum accelerating rate, the reduction in succeeding steps of resistance is much less, in view of the change in the steepness of the motor accelerating curve. During this period of the acceleration, slightly decreasing steps of resistance are desirable which enable the vernier resistor section to satisfactorily fulfill the requirements for smooth operation, which are as follows: (a) in its first notching progression, each succeeding step is considerably reduced in resistance for proper build-up to the maximum accelerating rate; (b) in the subsequent notching of the vernier resistor when paralleled with other sections, these widely varying steps produce relatively even steps which are desirable for the latter part of the acceleration operation.

Figure 2:
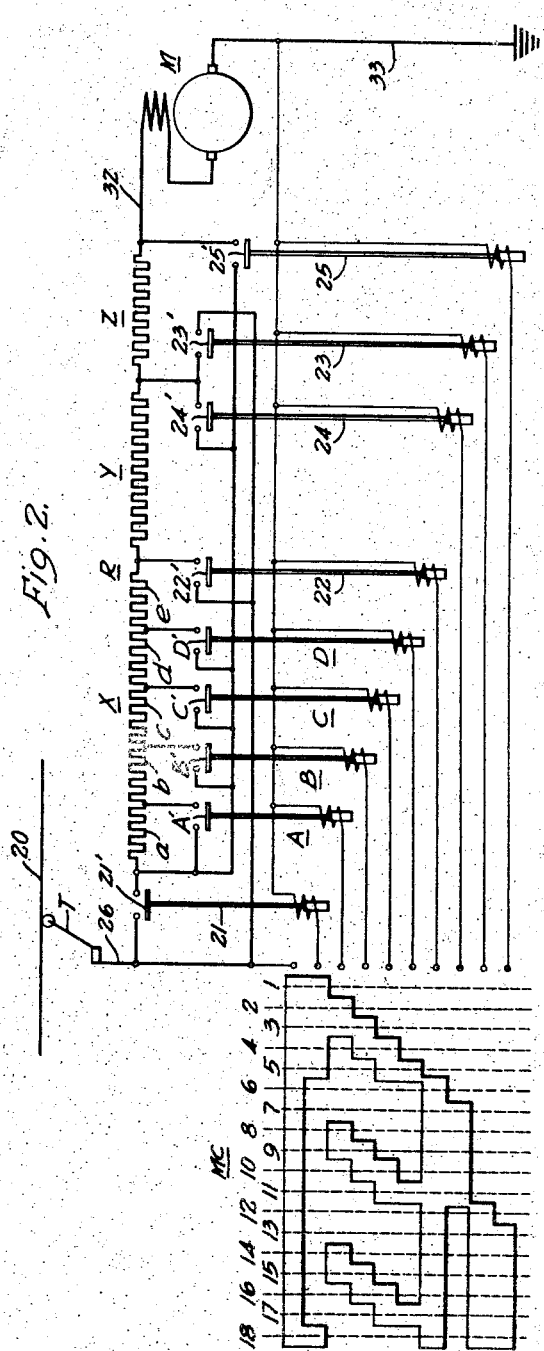
Fig. 2 is a similar view of a modified form of the invention.

In the modification of the invention illustrated in Fig. 2, the same sequence of connecting the resistor portions X, Y and Z in the motor circuit is followed as in the system illustrated in Fig. 1. However, power-operated contactors are provided for performing the switching operations, the operation of the contactors being controlled by a drum controller MC similar to the controller illustrated in Fig. 1.

As illustrated in the diagrammatic views shown in Figs. 3, 4 and 5 and by the sequence chart shown in Fig. 6, the resistor sections X, Y and Z are first connected in series with the motor M (see Fig. 3), then the resistors X and Y are connected in parallel circuit relation, and in series with the resistor Z (see Fig. 4) and finally the vernier section X and the fixed section Z are connected in parallel circuit relation as illustrated in Fig. 5.

The switching operations and the shunting of the vernier section X from the motor circuit in successive steps are performed by the operation of power-operated contactors 21 to 25, inclusive, and the resistor shunting switches A, B, C and D. The sequence of operation of the switches is illustrated in Fig. 6 and the manner of operation of the system is the same as hereinbefore described with reference to Fig. 1.

Referring to Figs. 2, 3, and 6, it will be seen that the resistors X, Y and Z are connected in series with the motor M by actuating the controller MC to position 1 to close the contactor 21. As the controller MC is actuated through positions 2 to 6, inclusive, the switches A, B, C, D and 22 are successively closed to shunt the resistor X from the motor circuit step-by-step.

When the controller is actuated to position 7, switches 22 and 24 are closed to connect the resistors X and Y in parallel and the two in series with the resistor Z, as illustrated in Fig. 4. The vernier section X is again shunted from the motor circuit step-by-step by actuating the controller MC through positions 8 to 12, inclusive.

Finally, when the controller is actuated to position 13, switches 22, 23 and 25 are closed to connect the sections X and Z in parallel circuit relation in the motor circuit, as illustrated in Fig. 5. By operating the controller through positions 14 to 18, inclusive, the vernier section X is again shunted from the motor circuit in successive steps, thereby controlling the effective resistance in the motor circuit, as previously described.

It will be noted that the sequence of operation of the resistor shunting switches A, B, C and D is always the same for each combination of the vernier section with the other sections of the resistor, thereby eliminating the necessity for complicated interlocking on the resistor shunting switches or an additional sequence drum for setting up the various combinations and circuits for controlling the different contactor sequences, as has been required in accelerating control systems previously utilized. In this manner the equipment required for the control operations is reduced and the operation of the system is simplified. Furthermore, a relatively large number of accelerating steps is provided with a comparatively small number of power operated contactors by utilizing the system herein described, thereby further reducing the necessary equipment for providing satisfactory acceleration of a motor which propels an electrical vehicle or other apparatus.

From the forgeoing description, it is apparent that I have devised a simple and efficient system for controlling the acceleration of an electric motor which provides a relatively large number of satisfactory accelerating steps with a minimum amount of control apparatus, thereby reducing the cost and weight of the apparatus required for a given number of accelerating steps, which is particularly advantageous for the control of vehicles of certain types as, for example, electrically-operated trolley buses or coaches where it is desirable to keep the size and weight of the control equipment at a minimum.

I do not desire to be restricted to the particular form or arrangements of parts herein shown and described, since it is evident that they may be changed and modified without departing from the spirit and scope of my invention as defined in the appended claims.

I claim as my invention:

1. In a motor control system, in combination, a motor, a source of power for the motor, a resistor for controlling the motor current, said resistor having a section of fixed resistance and a section of variable resistance connected in series-circuit relation at a permanent junction point, means for controlling the circuit relation of the resistor sections in the motor circuit, and means for varying the resistance of the variable section to control the effective resistance of the whole resistor.

2. In a motor control system, in combination, a motor, a source of power for the motor, a resistor for controlling the motor current, said resistor having a portion of fixed resistance and a portion of variable resistance connected in series-circuit relation at a permanent junction point, means for connecting said portions first in series and then in parallel circuit relation in the motor circuit, and means for varying the resistance of the variable portion to control the effective resistance of the whole resistor.

3. In a motor control system, in combination, a motor, a source of power for the motor, a resistor for controlling the motor current, said resistor having a portion of fixed resistance and a portion of variable resistance connected in series-circuit relation at a permanent junction point, means for connecting said resistor portions first in series and then in parallel circuit relation in the motor circuit, and means for varying the resistance of the variable portion during both the series and the parallel connections to control the effective resistance of the whole resistor.

4. In a motor control system, in combination, a motor, a source of power for the motor, a resistor for controlling the motor current, said resistor having a portion of variable resistance and a plurality of portions of fixed resistance all connected in series-circuit relation at permanent junction points, means for successively connecting the variable portion in parallel circuit relation to each one of the fixed portions and means for varying the resistance of the variable portion to control the effective resistance in the motor circuit.

5. In a motor control system, in combination, a motor, a source of power for the motor, a resistor for controlling the motor current, said resistor having a portion of variable resistance and a plurality of portions of fixed resistance all connected in series-circuit relation at permanent junction points, means for first connecting said portions in series with the motor, means for then successively connecting the variable portion in parallel circuit relation to each one of the fixed portions, and means for varying the resistance of the variable portion to control the effective resistance in the motor circuit.

6. In a motor control system, in combination, a motor, a source of power for the motor, a resistor for controlling the motor current, said resistor having a portion of variable resistance and a plurality of portions of fixed resistance all connected in series-circuit relation at permanent junction points, means for first connecting all of said portions in series with the motor, means for then connecting the variable portion in the motor circuit in parallel circuit relation to one of the fixed portions and in series with another of the fixed portions, and means for varying the resistance of the variable portion to control the effective resistance in the motor circuit.

7. In a motor control system, in combination, a motor, a source of power for the motor, a resistor for controlling the motor current, said resistor having a portion of variable resistance and a plurality of portions of fixed resistance all connected in series-circuit relation at permanent junction points, means for connecting all of said portions in series with the motor, means for then successively connecting the variable portion in the motor circuit first in parallel circuit relation to one of the fixed portions and in series with another of the fixed portions and then in parallel circuit relation to the latter fixed portion, and means for varying the resistance of the variable portion during each successive combination of the portions to control the effective resistance in the motor circuit.

8. In a motor control system, in combination, a motor, a source of power for the motor, a resistor for controlling the motor current, said resistor having a section of fixed resistance and a section of variable resistance permanently connected in series-circuit relation at their junction point, and a controller for connecting said sections first in series and then in parallel circuit relation in the motor circuit, said controller being adapted to vary the resistance of the variable section to control the effective resistance of the whole resistor.

9. In a motor control system, in combination, a motor, a source of power for the motor, a resistor for controlling the motor current, said resistor having a section of fixed resistance and a section of variable resistance permanently connected in series-circuit relation at their junction point, switching means for connecting said sections first in series and then in parallel circuit relation in the motor circuit, switching means for varying the resistance of the variable section to control the effective resistance of the whole resistor, and means for controlling the operation of said switching means.

GRAHAM L. MOSES.